United States Patent
Salvador et al.

(10) Patent No.: US 6,815,106 B1
(45) Date of Patent: Nov. 9, 2004

(54) FUEL CELL HAVING DYNAMICALLY REGULATED BACKPRESSURE

(75) Inventors: John P. Salvador, Rochester, NY (US); James W. Dandalides, Webster, NY (US); William Henry Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 96 days.

(21) Appl. No.: 09/584,210

(22) Filed: May 31, 2000

(51) Int. Cl.[7] .......................... H01M 8/04; H01M 8/12; H01M 8/00

(52) U.S. Cl. ......................... 429/22; 429/13; 429/24; 429/25

(58) Field of Search ...................... 429/22, 24, 25, 429/13

(56) References Cited

U.S. PATENT DOCUMENTS

| | | | | |
|---|---|---|---|---|
| 4,098,959 A | * | 7/1978 | Fanciullo | 429/25 |
| 4,289,836 A | * | 9/1981 | Lemelson | 429/61 |
| 4,838,020 A | * | 6/1989 | Fujitsuka | 60/39.07 |
| 5,605,770 A | * | 2/1997 | Andreoli et al. | 429/20 |
| 5,925,476 A | * | 7/1999 | Kawatsu | 429/24 |
| 6,015,634 A | * | 1/2000 | Bonville, Jr. et al. | 429/17 |
| 6,350,536 B1 | * | 2/2002 | Ban et al. | 429/13 |

* cited by examiner

*Primary Examiner*—Patrick Ryan
*Assistant Examiner*—Julian Mercado
(74) *Attorney, Agent, or Firm*—Cary W. Brooks (57) ABSTRACT

A fuel cell system having a dynamically controlled pressure regulator for varying the backpressure on the system under varying ambient temperatures and pressures.

18 Claims, 3 Drawing Sheets

FUEL CELL HAVING DYNAMICALLY REGULATED BACKPRESSURE

TECHNICAL FIELD

This invention relates to fuel cell systems for powering electric vehicles that are used over a wide range of ambient and operating conditions, and more particularly to optimizing the performance of such systems under such conditions by actively varying the system's backpressure.

BACKGROUND OF THE INVENTION

Fuel cells in general, and PEM fuel cells in particular, have been proposed for use as electrical power plants to replace internal combustion engines. PEM fuel cells are well known in the art, and include a "membrane electrode assembly" (a.k.a. MEA) comprising a thin, proton transmissive, solid polymer membrane-electrolyte having an anode catalyst layer on one of its faces and a cathode catalyst layer on the opposite face. The MEA is sandwiched between a pair of electrically conductive current collectors which also serve to distribute hydrogen to the anode and oxygen (i.e. from compressed air) to the cathode. The $H_2$ and $O_2$ react to form water that exits the fuel cell primarily as part of the cathode exhaust (a.k.a. cathode tailgas). The cathode/air feedstream (and sometimes the anode/$H_2$ stream) is typically humidified to keep the ion-exchange membrane from drying out.

Some fuel cell systems use pressurized, or liquid, hydrogen to fuel the fuel cell. Others store the hydrogen chemically as a thermally dissociable hydride, or physiochemically by heat-releasable adsorption on a suitable adsorbent (e.g. carbon nanofibers). Still others dissociate hydrogenous liquids such as gasoline, methanol, or the like to provide the hydrogen used by the fuel cell. To release their hydrogen, hydrogenous liquids are dissociated in a so-called "fuel processor". One known fuel processor for dissociating gasoline, for example, is a two stage primary reactor known as an "autothermal reformer". In an autothermal reformer, gasoline and water vapor (i.e. steam) are mixed with air and pass sequentially through two reaction sections, i.e. a first "partial oxidation" (POX) section, and a second "steam reforming" (SR) section. In the POX section, the gasoline reacts exothermically with a substoichiometric amount of air to produce carbon monoxide, hydrogen and lower hydrocarbons (e.g. methane). The hot POX reaction products pass into the SR section where the lower hydrocarbons react with the steam to produce a reformate gas comprising principally hydrogen, carbon dioxide, carbon monoxide, water methane and nitrogen. One such autothermal reformer is described in International Patent Publication Number WO 98/08771 published Mar. 5, 1998. The process of producing hydrogen from methanol is similar to that used for gasoline wherein the primary reactor can either be (1) POX only, (2) POX+SR, or (3) SR only. One known fuel processor for dissociating methanol is a steam reformer such as described in U.S. Pat. No. 4,650,727 to Vanderborgh. In both cases, the steam reformers require water as one of the reactants.

The carbon monoxide concentration in the reformate exiting a primary reactor is too high for the reformate to be used in a fuel cell without poisoning it. Accordingly, most fuel processors include a downstream section for cleansing the reformate of CO by subjecting it to CO separation membranes, to CO-adsorption media, or to a so-called "water-gas-shift" (WGS) reaction wherein water (i.e. steam) reacts exothermically with the carbon monoxide to produce $CO_2+H_2$. The WGS reaction also requires water as a reactant. A so-called PrOx (i.e. preferential oxidation) reactor may also be used downstream of the water-gas-shift reactor to remove any residual CO exiting the WGS reactor.

It is known to burn the cathode and anode tailgases exiting a fuel cell in a downstream combuster to form water, and to provide heat for use elsewhere in the system, e.g. to heat the fuel processor. Moreover, it is known that water management of fuel cell systems that are to be used for vehicular applications (i.e. cars, trucks, buses etc.) is an important consideration. In this regard, it is desirable to collect the water generated by the fuel cell system (e.g. from the combustor exhaust and/or the fuel cell tailgases) and reuse it elsewhere in the system (e.g. in the fuel processor, the water-gas-shift reactor or a humidifier) where it is needed rather than storing an extra supply of water on-board for such system needs. Optimally, the system will operate under a condition known as "water neutrality"—that is, that the system will produce all the water that the system requires. Accordingly, it is known to provide one or more condensers at various locations within the system to condense water from the various gas streams and direct it to a water collection tank from whence it is distributed to where it is needed. The ability to effectively condense water generated by the system varies with the ambient conditions surrounding the system. Hence for example, it is more difficult to condense water at higher altitudes (i.e. lower pressure), and at higher temperatures than it is to condense water at low temperatures and high pressures. Also, the efficiency of the system, as well as that of the fuel cell itself, are affected by ambient temperature and pressure. Hence, for example the fuel cell is more efficient and can produce more power when it operates at higher pressures. Moreover, the compressor that provides compressed air to the fuel cell stack can only operate effectively within a defined range of operating parameters. In this regard, the performance of each compressor, whether it be a centrifugal or positive-displacement type compressor, is defined by a compressor performance map which (1) is a plot of the compressor pressure ratio (i.e. compressor output pressure/compressor inlet pressure) on the vertical axis versus the mass flow rate of air on the horizontal axis, and (2) shows the operating envelope where acceptable performance is possible for that particular compressor. The compressor inlet pressure is equal to the ambient pressure minus any inlet losses. That operating envelope (hereafter "normal operating envelope") is bounded by two extremes beyond which the compressor will not work effectively e.g., because of surge, overheating, choked flow, or some other condition that is deleterious to the compressor or its performance.

The present invention dynamically controls the system's backpressure to optimize water recovery, system efficiency, cell performance and compressor performance under varying conditions of ambient temperatures and pressures.

SUMMARY OF THE INVENTION

The present invention comprehends a method and apparatus for optimizing the performance (e.g. electrical output, compressor efficiency, water neutrality, system efficiency, etc.) of a fuel cell system under changing ambient conditions (i.e. temperature and pressure). The invention involves a fuel cell system of the type that comprises (1) a fuel cell having an anode outlet that discharges a $H_2$-containing anode tailgas and a cathode outlet that discharges an $O_2$-containing cathode tailgas, (2) a hydrogen source for providing hydrogen to an anode of said fuel cell, and (3) an air compressor for providing oxygen to a cathode of said fuel cell. The system may also include one or more, condenser(s) for condensing water out of one or more of the system's reactant streams, and a combuster for combusting electrode tailgas (es).

In accordance with one aspect of the invention, there is a method that comprises: (a) providing a modulateable pressure regulator downstream of the cathode outlet for varying the backpressure of the cathode tailgas; (b) sensing the ambient (e.g. temperature, pressure, humidity etc.) surrounding the system, and sending a signal(s) indicative thereof to a controller; (c) sensing at least one operating condition of the system (e.g. water collected, compressor inlet/outlet pressure, system backpressure, etc.) and sending a signal(s) indicative thereof to a controller; and (d) modulating the regulator, via the controller, in response to the signals to optimize the performance of the system under those ambient/operating conditions. The regulator may be positioned solely in the cathode tailgas stream, or downstream of a combuster that burns the cathode and anode tailgases before emitting them to the atmosphere. According to one embodiment of the invention, the system backpressure is increased as the ambient temperature increases to make it easier to condense water at elevated temperatures. In another embodiment of the invention, the system backpressure is increased as the ambient pressure decreases (e.g. at high elevations) to help maintain a substantially constant compressor output pressure, and hence a substantially constant operating pressure in the fuel cell. In still another embodiment of the invention, the backpressure is reduced when the compressor ratio (i.e. pressure compressor output pressure/compressor inlet pressure) is such as to cause the compressor to operate outside its acceptable operating envelope (e.g. in the surge region of a centrifugal compressor).

Another aspect of the invention involves apparatus for carrying out the aforesaid method. In this regard, there is provided a fuel cell system that includes: (1) a fuel cell having an anode outlet that discharges a $H_2$-containing anode tailgas and a cathode outlet that discharges an $O_2$-containing cathode tailgas; (2) a hydrogen source for providing hydrogen to an anode of the fuel cell; and (3) an air compressor for providing oxygen to a cathode of the fuel cell. In accordance with this apparatus aspect of the invention, the system further includes: (a) a modulateable pressure regulator associated with the cathode outlet for varying the backpressure of the cathode tailgas; (b) pressure sensor for sensing the compressor output pressure and sending signals indicative thereof to a controller; and (c) a controller associated with the pressure regulator and the sensor for modulating the regulator so as to vary the backpressure in response to the output pressure of the compressor such as to maintain the output pressure substantially constant (i.e. near a predetermined set point), regardless of ambient pressure. In another embodiment of the apparatus, there is further provided: (i) a combuster for burning the anode and cathode tailgases to produce a water-containing exhaust gas; (ii) an exhaust outlet from the combuster for discharging the exhaust gas from the combuster; (iii) a modulateable pressure regulator associated with the exhaust outlet for varying the backpressure of the exhaust gas; (iv) a first pressure sensor for sensing the ambient pressure and sending a signal indicative thereof to a controller; (v) a first temperature sensor for sensing the ambient temperature and sending a signal indicative thereof to a controller; (vi) a second pressure sensor for sensing the backpressure of the exhaust gas and sending a signal indicative thereof to a controller; and (vii) a controller associated with the pressure regulator for modulating the regulator so as to vary the backpressure in response to the ambient temperature/ pressure and the backpressure. Another embodiment includes a sensor for sensing the compressor output pressure and the controller varies the system backpressure via the pressure regulator in response to the ambient temperature/ pressure, the compressor output pressure, and the system backpressure. In still another embodiment, the system includes a condenser for condensing water out of the exhaust gas, a tank for collecting the condensed water for use within the system, a level detector associated with the tank for detecting the level of water in the tank and sending a signal indicative thereof to controller, and a controller associated with the pressure regulator for modulating the regulator so as to vary the backpressure on the system in response to the ambient temperature/pressure, the backpressure and the water level in the tank.

DESCRIPTION OF SPECIFIC EMBODIMENTS

Figure 1:
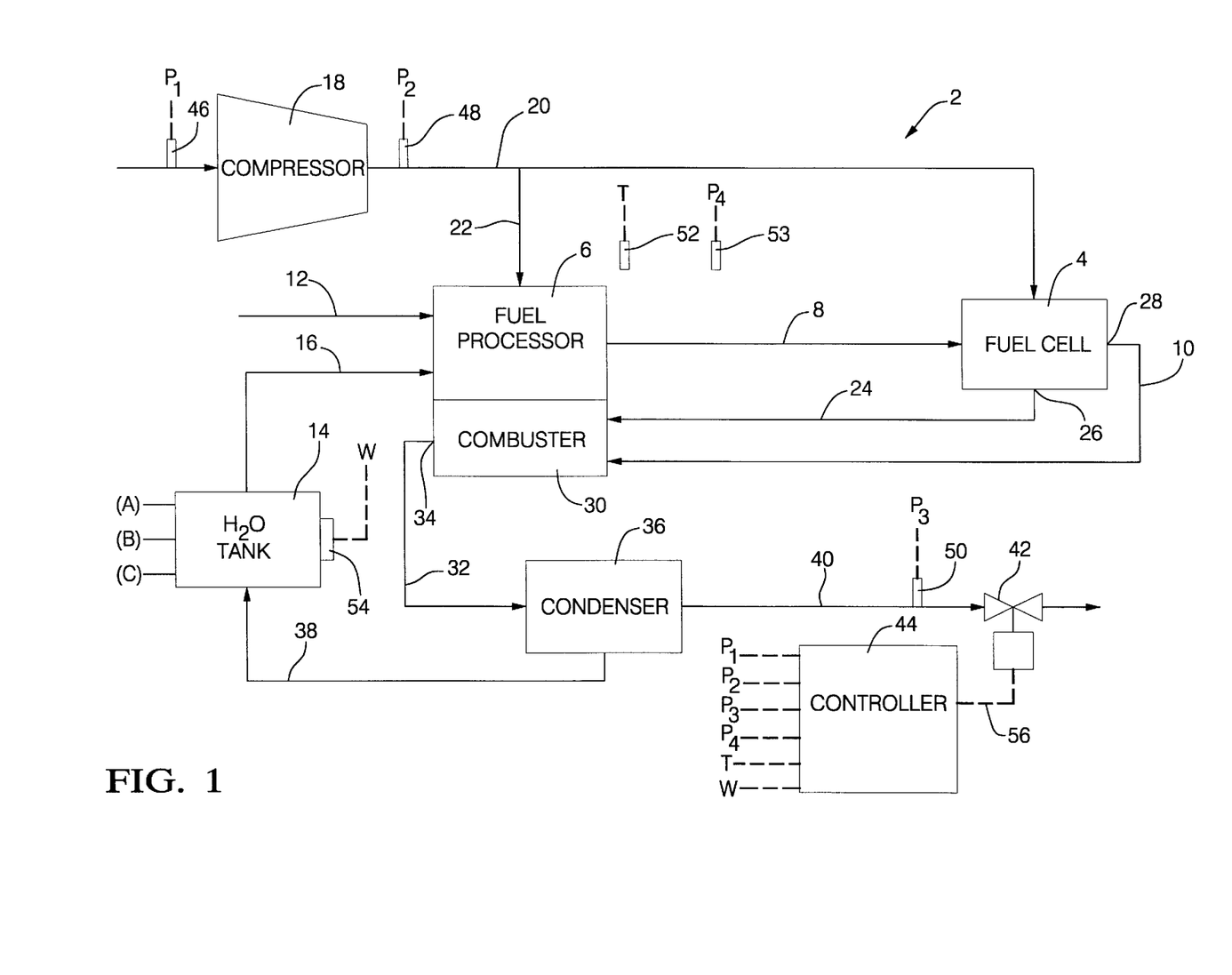
FIGS. 1–3 are schematic diagrams of three different fuel cell systems in accordance with the present invention.

FIG. 1 depicts a fuel cell system 2 comprising a hydrogen and oxygen consuming fuel cell 4 that is fueled by hydrogen produced in a fuel processor 6 and delivered to the anode side of the fuel cell 4 via line 8. As only part of the hydrogen fed to the fuel cell is consumed in the fuel cell 4 some residual $H_2$ exits the fuel cell 4 at anode outlet 28 as hydrogen anode tailgas 10. The hydrogen source is the fuel processor 6 which may comprise a steam reformer, autothermal reformer or other similar device for converting fuels such as methane, methanol, gasoline or the like, supplied from line 12 into the hydrogen. Water is supplied from a tank 14 to the fuel processor 6 via line 16 for reaction therein (e.g. in the steam reformer or WGS sections). Compressor 18 provides air to the fuel processor 6 via lines 20 and 22. The compressor 18 also provides air to the cathode side of the fuel cell 4 via line 20. Not all of the oxygen in the air is consumed in the fuel cell 4. Accordingly oxygen-containing tailgas 24 exits the fuel cell 4 at cathode outlet 26. The hydrogen-containing anode tailgas 10 exiting the fuel cell at the anode outlet 28 and the oxygen-containing tailgas 24 exiting the fuel cell at cathode outlet 26 flow into a combustor 30 where they are burned to produce an exhaust gas 32 exiting the combuster 30 at the exhaust outlet 34. The exhaust gas 32 contains a significant amount of water which is condensed in condenser 36 and recycled back to the water tank 14 via return line 38. The tank 14 may be a stand-alone unit (as shown), or form part of the condenser (not shown). The de-watered exhaust gas exits the condenser 36 via line 40 and is eventually discharged to the atmosphere via a modulatable pressure regulator 42. A controller 44 controls the pressure regulator 42 so as to vary the back pressure on the system 2 in response to signals from a plurality of sensors that sense various operating conditions to the system 2, as well as the ambient temperature and pressure. In this regard, (1) a pressure sensor 46 senses the inlet pressure to the compressor 18, (2) a pressure sensor 48 on the aft end of the compressor 18 senses the output pressure of the compressor 18, and (3) a pressure sensor 50 senses the pressure in line 40 which is the backpressure imposed on the system 2 by the regulator 42. A temperature sensor 52 senses the ambient temperature and pressure sensor 53 senses the ambient pressure surrounding the fuel cell system 2, A water level sensor 54 senses the level of the water in the water tank 14. The controller 44 takes the form of a conventional general purpose digital computer based controller programmed to control the modulation of the regulator in response to ambient and system operating conditions. Accordingly, the controller includes a common digital computer with associated read-only memory (ROM), read-write random access memory (RAM), electrically programmable read only memory (EPROM), electrically programmable "flash" memory, a central processing unit (CPU), and input/output sections which interface with the ambient and system sensors and the regulator. The read-only memory of the digital computer of the controller contains the instructions necessary to implement the basic input/output instructions. The electrically programmable "flash" memory contains the instructions necessary to implement appropriate control algorithms. The electrically programmable read only memory (EPROM) contains the calibration constants against which the various operating parameters are compared as needed. A specific program for carrying out the invention may be accomplished by standard skill in the art using conventional information processing languages.

The system 2 depicted in FIG. 1 may be operated in a number of different ways. For example, to achieve water neutrality in the systems, a condenser is provided in the combuster exhaust stream. Effective water collection however is very temperature and pressure dependent. In this regard, at a constant pressure, the ability to condense water decreases as the ambient temperature increases. Similarly, at a constant temperature the ability to condense water decreases as the ambient pressure decreases. Hence in accordance with one aspect of the present invention, the backpressure on the system 2 is increased as the ambient temperature increases in order to enhance the ability of the condenser(s) to condense water therein. When the water tank 14 contains sufficient amount of water to satisfy the system's needs, the system 2 will operate under normal (i.e. reduced pressure) conditions, and the condenser 36 will produce enough water to maintain the level of the water in the tank 14 at a sufficiently high level. However under conditions of high temperature or high elevation, the condenser 36 will not be effective to condense enough water (unless it is excessively large), and the level of the water in tank 14 will drop. When the level of the water in tank 14 drops below a satisfactory level, the water level sensor 54 sends a signal to the controller 44 which, in turn, sends a control signal 56 to the backpressure regulator 42, that causes it to increase the backpressure 40 of the exhaust gas exiting the condenser 36, and thereby increase the pressure throughout the system 2.

In another situation, it is desirable to maintain the compressor output pressure, and hence input pressure to the fuel cell 4, at a substantially constant level irrespective of the ambient pressure. Hence for example, it may be desirable to have the anode input pressure to the fuel cell 4 the same at sea level as it is on a mountaintop. To accomplish this, the pressure sensor 48 monitors the pressure in line 20. When the pressure in line 20 begins to fall incident to an increase in elevation, the sensor 48 signals the controller 44. The input signal from sensor 48 is compared to the desired pressure that is present in the controller. If the sensed pressure is lower than the desired pressure, the controller 44 signals the regulator 42 to increase the backpressure on the system until the pressure in line 20 returns to the desired pressure. Alternatively, it may also be desirable to operate with a compressor output pressure at its most efficient point at all times and to adjust the system backpressure to keep the compressor operating at that high efficiency point regardless of the ambient temperature or pressure.

It might also be desirable to maximize the overall system efficiency whenever possible. To this end, it is necessary to reduce the parasitic load on the system caused by the power requirements of the compressor 18. To accomplish this, pressure sensors 46, 48 and 53, and temperature sensor 52, provide appropriate signals to the controller 44 which in turn provides a signal 56 that controls the pressure regulator 42 and causes it to reduce the back pressure on the system 2. In so doing, the compressor pressure ratio (i.e. P2/P1) is reduced which, in turn, reduces the power needed to drive the compressor 18, and improves the overall efficiency of the system.

Different system requirements place competing demands on the pressure regulator in terms of the backpressure that it develops. Hence for example, while more water can be condensed at higher pressures it is at the expense of higher power demands by the compressor which in turn can result in lower overall system efficiency. Likewise, it is possible that the backpressure for one requirement could be detrimental to the proper functioning of the compressor 18, if the selected backpressure forces the compressor to operate outside of its acceptable operating envelope. Hence when adjusting the backpressure for one purpose, e.g. to achieve water neutrality, it should be done in a manner which ensures that other system needs are met. Hence for example, it may be necessary to reduce the system backpressure at higher altitudes in order to reduce the compressor pressure ratio to an acceptable level even though higher pressures might be desirable for water neutrality purposes. To take these competing demands into consideration, bench tests are conducted to determine the best compressor backpressure for the system, at a plurality of combinations of ambient temperatures and pressure, that will satisfy the system's water and efficiency requirements. The data obtained from these tests is used to construct a look-up table that is stored in the controller 44. During the operation of the vehicle, sensors 53 and 52 provide ambient pressure and temperature inputs to the controller 44 which uses the look-up table to determine the best (i.e. target) backpressure, and adjust the regulator 42 accordingly. Sensor 50 notifies the controller 44 when the target backpressure is reached. Other variables, such as compressor pressure ratio, relative humidity, fuel cell output power, etc. may also be included in the look-up table for an even more sophisticated control scheme.

The following are some typical vehicle driving scenarios where the present invention is applicable. These scenarios are contemplated with a fuel cell stack operating at a temperature between about 70° C. and 90° C., a water tank 14 temperature greater than 0° C., a condenser 36 outlet temperature between about 50° C. and 80° C., and a compressor output pressure between about 110 and 300 kPa. SCENARIO 1—The vehicle would be started and warmed-up under normal low backpressure conditions. Since the plumbing and other system components are still cold, it is easy to condense water—so the water tank 14 readily fills up to level A shown in FIG. 1. If after the system has come up to its operating temperature, the water level falls below level C, the regulator 42 is adjusted to increase the backpressure to enhance the ability of the condenser 36 to condense more water and ship it to tank 14. When the water level reaches level B, the backpressure is then reduced to maintain a water level in the tank between level A and level C. SCENARIO 2—When the vehicle is operated at a normal altitude (i.e. between sea level and the mountain top) but on a very hot day, it is desirable to maintain the water level between levels A and B. When the water level falls below level B, the backpressure is increased to enhance the condensation of the water in the condenser until sufficient water is accumulated in the tank 14. If the water level continues to drop after reaching level B, the power output from the fuel cell is reduced so as to reduce the system's demand for water until sufficient water can accumulate in the tank 14. SCENARIO 3—If the ambient pressure is low (e.g. at high elevations) the backpressure is initially reduced to keep the compressor 18 operating within its effective operating envelope. The backpressure is then increased to collect more water (e.g. to water levels B and C). The system then shuttles back and forth between the higher and lower backpressures as needed to keep the system operational. SCENARIO 4—To accelerate the vehicle under normal altitude and temperature conditions, the backpressure is reduced to allow a net system power increase. If under these same conditions of acceleration, temperature and pressure, the water level drops below level C, the backpressure is increased to ensure that enough water is collected. After acceleration is completed, the system is returned to its normal operating backpressure. SCENARIO 5—On the other hand, if the vehicle is accelerating under a high altitude condition, the backpressure is increased when the water level falls below point B, but otherwise operated in the same fashion as described in Scenario 4.

Figure 2:
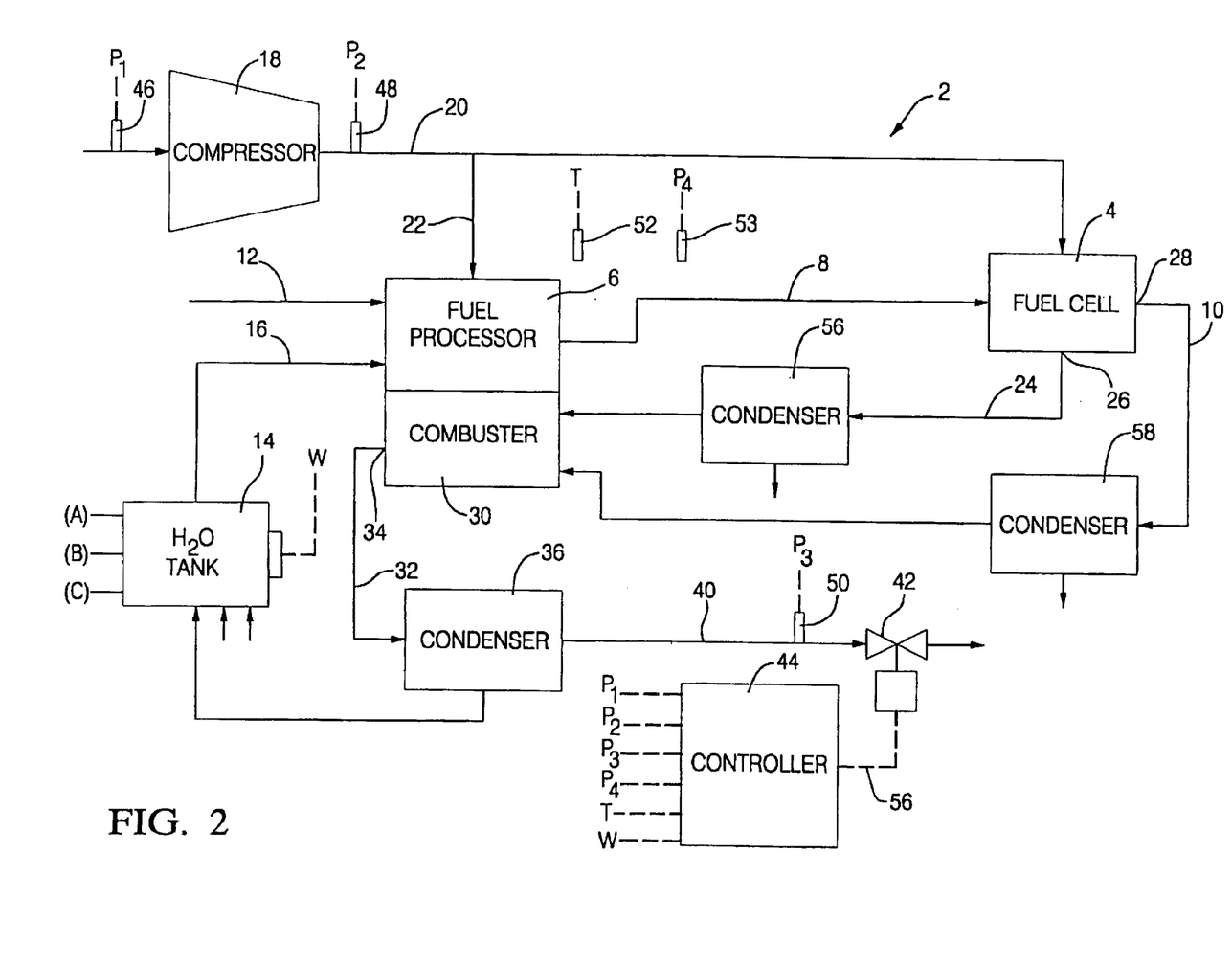

FIG. 2 depicts another embodiment of the present invention which is essentially the same as that depicted in FIG. 1 but with the addition of a condenser 56 for condensing water from the cathode tailgas 24, and a condenser 58 for condensing water from the anode tailgas 10. Otherwise, this system operates in the same manner as described above in conjunction with FIG. 1, but with the condensers 56 and 58 responding in the same manner as discussed above in conjunction with condenser 36. Another variation (not shown) of FIG. 1 includes an expander either between the combustor 30 and condenser 36, or after the condenser 36, for capturing and reusing some of the energy in the combustor exhaust 32 (e.g. to drive the compressor 18). If an expander is used, additional sensors could be located at the expander inlet and outlet and coupled to the controller for managing the combined compressor-expander operating envelopes consistent with the pressure requirements of the fuel cell and the condenser(s).

Figure 3:
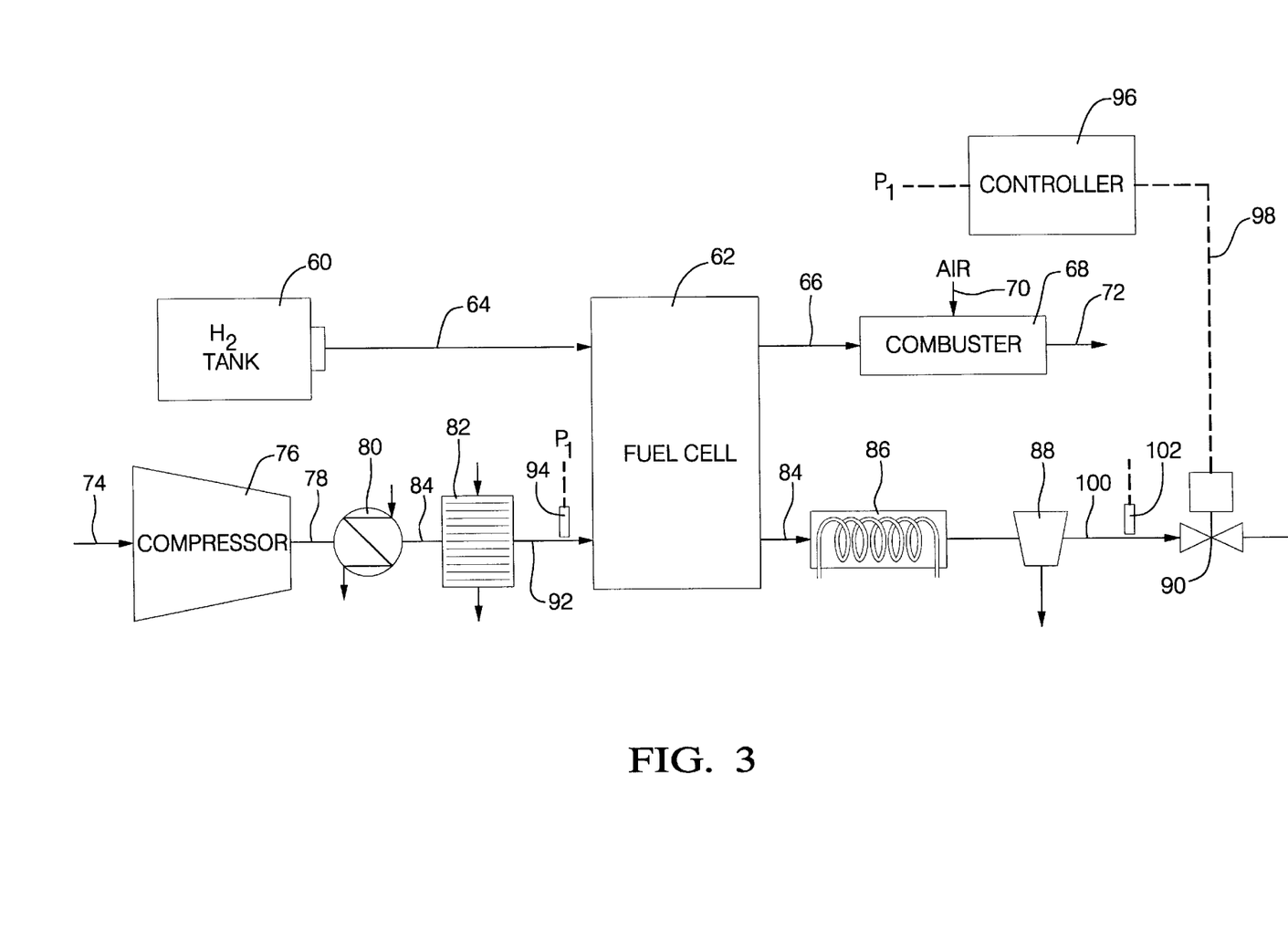

FIG. 3 depicts yet another embodiment of the present invention wherein the hydrogen source is pure hydrogen (rather than reformed hydrogen) stored in an appropriate pressure, cryogenic or adsorption vessel 60. The hydrogen is supplied to the anode side of the fuel cell 62 via line 64 along with air 70 before exhausting to the ambient via line 72. Ambient air 74 is compressed in compressor 76 and discharged via line 78 into a cooler 80, and thence into a humidifier 82 via line 84. The cooled and humidified air is then introduced into the cathode side of the fuel cell 62 via line 92. The cathode tailgas exits the fuel cell 62 in line 84 and flows into a condenser 86, and thereafter into a cyclonic water separator 88 prior to being exhausted to the ambient via pressure regulator 90. In this embodiment, it is desired to keep the pressure of the input air to the fuel cell 62 (i.e. in line 92) substantially constant or near a preset pressure point regardless of changes in the ambient temperature or pressure. To this end, a pressure sensor 94, in communication with the inlet line 92, monitors the pressure in the line 92 and sends a signal back to a controller 96. The controller 96 compares the pressure in line 92 to the desired preset pressure value and sends a signal 98 to the pressure regulator 90 to cause it to adjust the backpressure in the line 100, as needed to maintain the input pressure in line 92 substantially constant (i.e. at or near the preset value). To this end, the pressure regulator 90 will increase the backpressure as the vehicle is driven to higher and higher elevations, and will reduce the backpressure as the vehicle returns to normal elevation. A pressure sensor 102 monitors the backpressure in line 100, and sends a signal indicative thereof to the controller 96.

While the invention has been disclosed primarily in terms of specific embodiments thereof, it is not intended to be limited thereto but rather to the extent set forth hereafter in the claims which follow.

What is claimed is:

1. A method of controlling a fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, and an air compressor operable at various output pressures in the range between 112 kPa to about 300 kPa for providing pressurized air to a cathode of said fuel cell, comprising the steps of:

providing a modulateable pressure regulator downstream of said cathode outlet for controlling backpressure on said cathode tailgas;

sensing at least one ambient condition surrounding said system, said ambient condition being selected from the group consisting of ambient pressure, and ambient temperature, and sending a signal indicative thereof to a controller;

sensing at least one operating condition of the system that is affected by said ambient condition, and sending a signal indicative thereof to a controller; and regulating said backpressure, via said controller and regulator, in response to said signals to optimize the performance of said system at said at least one ambient condition.

2. The method according to claim 1 wherein said regulating is such as to increase said backpressure when said ambient temperature increases.

3. A method for controlling a fuel cell system comprising a fuel cell having an anode outlet that discharges an $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor burning said anode and cathode tailgases to produce a water-containing exhaust gas, and an exhaust outlet from said combustor for discharging said exhaust gas from said combustor, comprising the steps of:

providing a modulateable pressure regulator downstream of said exhaust outlet for controlling backpressure on said exhaust gas;

sensing ambient pressure surrounding said system, and sending a signal indicative thereof to a controller;

sensing ambient temperature surrounding said system, and sending a signal indicative thereof to a controller; and regulating said backpressure via said controller and regulator in response to said signals so as to effect varying backpressure on said system under varying ambient pressure and/or temperature.

4. A method of controlling a fuel cell system comprising a fuel cell having an anode outlet that discharges a $H_2$-containing anode tailgas and a cathode outlet that discharges an $O_2$-containing cathode tailgas at a pressure, a hydrogen source for providing hydrogen to an anode of said fuel cell, and an air compressor for providing air to a cathode of said fuel cell, comprising the steps of:

providing a modulateable pressure regulator downstream of said cathode outlet for controlling said cathode tailgas pressure;

sensing ambient pressure surrounding said system, and sending a signal indicative thereof to a controller;

sensing output pressure of said air compressor, and sending a signal indicative thereof to a controller; and regulating said backpressure via said controller and regulator to vary said cathode tailgas pressure in response to said ambient pressure so as to maintain said output pressure substantially constant regardless of variations in said ambient pressure.

5. A method for controlling a water-producing fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor burning said anode and cathode tailgases to produce a water-containing exhaust gas, an exhaust outlet from said combustor for discharging said exhaust gas from said combustor, and a water condenser associated with said exhaust outlet for condensing water out of said exhaust gas, comprising the steps of:

providing a modulateable pressure regulator downstream of said exhaust outlet for controlling backpressure on said exhaust gas;

sensing ambient temperature surrounding said system, and sending a signal indicative thereof to a controller;

sensing the backpressure of said exhaust gas upstream of said regulator and sending a signal indicative thereof to said controller; and regulating said backpressure via said controller and regulator in response to said signals so as to increase said backpressure at elevated ambient temperatures and thereby increase the effectiveness of said condenser in condensing said water at said elevated ambient temperatures.

6. A method for controlling a fuel cell system comprising a fuel cell having an anode outlet that discharges an $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor burning said anode and cathode tailgases to produce a water-containing exhaust gas, and an exhaust outlet from said combustor for discharging said exhaust gas from said combustor, comprising the steps of:

providing a modulateable pressure regulator downstream of said exhaust outlet for controlling backpressure on said exhaust gas;

sensing ambient pressure surrounding said system, and sending a signal indicative thereof to a controller;

sensing ambient temperature surrounding said system, and sending a signal indicative thereof to a controller;

sensing output pressure of said compressor, and sending a signal indicative thereof to a controller; and regulating said backpressure via said controller and regulator in response to said signals so as to effect varying backpressure on said system under varying compressor output pressure and ambient temperature or pressure conditions.

7. A method for controlling a water-producing fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor burning said anode and cathode tailgases to produce a water-containing exhaust gas, an exhaust outlet from said combustor for discharging said exhaust gas from said combustor, a water condenser associated with said exhaust outlet for condensing water out of said exhaust gas, and a tank for collecting a quantity of water condensed from said condenser for use within said system, comprising the steps of:

providing a modulateable pressure regulator associated with said exhaust outlet for controlling backpressure on said exhaust gas;

sensing ambient temperature surrounding said system, and sending a signal indicative thereof to a controller;

sensing the quantity of water in said tank and sending a signal indicative thereof to a controller;

sensing said backpressure upstream of said regulator and sending a signal indicative thereof to said controller; and regulating said backpressure via said controller and regulator in response to said signals so as to increase said backpressure when said ambient temperature is elevated and said water quantity is below a predetermined quantity, and decreasing said backpressure when said water level is above said predetermined quantity.

8. A method for controlling a water-producing fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, said compressor having an inlet pressure, an outlet pressure and an effective operating range of outlet/inlet pressure ratios, a combustor burning said anode and cathode tailgases to produce a water-containing exhaust gas, an exhaust outlet from said combustor for discharging said exhaust gas from said combustor, a water condenser associated with said exhaust outlet for condensing water out of said exhaust gas, and a tank for collecting a quantity of water from said condenser for use within said system, comprising the steps of:

providing a modulateable pressure regulator associated with said exhaust outlet for controlling backpressure on said exhaust gas;

sensing the inlet pressure to said compressor, and sending a signal indicative thereof to a controller;

sensing ambient temperature surrounding said system, and sending a signal indicative thereof to a controller;

sensing output pressure of said compressor and sending a signal indicative thereof to a controller;

sensing the quantity of water in said tank and sending a signal indicative thereof to a controller;

sensing said backpressure upstream of said regulator and sending a signal indicative thereof to said controller; and regulating said backpressure via said controller and regulator in response to said signals so as to increase said backpressure when said ambient temperature is elevated and said water quantity is below a predetermined quantity, and decreasing said backpressure when the ratio of said output pressure to said inlet pressure is outside said effective operating range.

9. A method of controlling a fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, and an air compressor for providing air to a cathode of said fuel cell said compressor having an inlet pressure, an outlet pressure, and an effective operating range of outlet/inlet pressure ratios, comprising the steps of:
- providing a modulateable pressure regulator downstream of said cathode outlet for controlling backpressure on said cathode tailgas;
- sensing the inlet pressure to said compressor, and sending a signal indicative thereof to a controller;
- sensing ambient pressure surrounding said system, and sending a signal indicative thereof to the controller;
- sensing the output pressure of said compressor, and sending a signal indicative thereof to the controller; and
- regulating said backpressure via said controller and regulator in response to said signals so as to reduce said backpressure when said ambient pressure is low and the ratio of said output pressure to said inlet pressure is outside said effective operating range.

10. In a fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, and an air compressor for providing air to a cathode of said fuel cell the improvement comprising:
- a modulateable pressure regulator associated with said cathode outlet for controlling backpressure on said cathode tailgas;
- a pressure sensor for sensing said compressor's output pressure and sending a signal indicative thereof to a controller;
- a pressure sensor for sensing ambient pressure surrounding said system and sending a signal indicative thereof to said controller; and
- a controller associated with said pressure regulator and said sensors for modulating said regulator to vary said backpressure in response to said output pressure and said ambient pressure so as to maintain said output pressure substantially constant regardless of ambient pressure.

11. In a fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor for burning said anode and cathode tailgases to produce a water-containing exhaust gas, and an exhaust outlet from said combustor for discharging said exhaust gas from said combustor, the improvement comprising:
- a modulateable pressure regulator associated with said exhaust outlet for controlling backpressure on said exhaust gas;
- a first pressure sensor for sensing ambient pressure and sending a signal indicative thereof to a controller;
- a first temperature sensor for sensing ambient temperature and sending a signal indicative thereof to a controller;
- a second pressure sensor for sensing the backpressure of said exhaust gas and sending a signal indicative thereof to a controller; and
- a controller associated with said pressure regulator for modulating said regulator so as to vary said backpressure in response to said ambient temperature, ambient pressure and backpressure signals to optimize overall performance of the system under varying conditions of ambient temperature and/or ambient pressure.

12. In a fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor for burning said anode and cathode tailgases to produce a water-containing exhaust gas, and an exhaust outlet from said combustor for discharging said exhaust gas from said combustor, the improvement comprising:
- a modulateable pressure regulator associated with said exhaust outlet for controlling backpressure on said exhaust gas;
- a first pressure sensor for sensing ambient pressure and sending a signal indicative thereof to a controller;
- a first temperature sensor for sensing the ambient temperature and sending a signal indicative thereof to said controller;
- a second pressure sensor for sensing said compressor's output pressure and sending a signal indicative thereof to said controller;
- a third pressure sensor for sensing the backpressure of said exhaust gas and sending a signal indicative thereof to said controller; and
- a controller associated with said pressure regulator for modulating said regulator so as to vary said backpressure in response to said ambient temperature and pressure, said output pressure of said compressor, and said backpressure signals to optimize the overall performance of said system under varying conditions of ambient temperature and/or ambient pressure.

13. In a fuel cell system comprising a fuel cell having an anode outlet that discharges a $H_2$-containing anode tailgas and a cathode outlet that discharges an $O_2$-containing cathode tailgas, a hydrogen source for providing hydrogen to an anode of said fuel cell, an air compressor for providing air to a cathode of said fuel cell, a combustor burning said anode and cathode tailgases to produce a water-containing exhaust gas, an exhaust outlet from said combustor for discharging said exhaust gas from said combustor, a condenser for condensing water out of said exhaust gas, and a tank for collecting a quantity of water condensed from said condenser for use within said system, the improvement comprising:
- a modulateable pressure regulator associated with said exhaust outlet for controlling backpressure on said exhaust gas;
- a controller associated with said pressure regulator for modulating said regulator so as to vary said backpressure in response to (a) ambient temperature, (b) ambient pressure, (c) said backpressure and (d) said quantity of water in said tank;
- a first pressure sensor for sensing ambient pressure and sending a signal indicative thereof to said controller;
- a first temperature sensor for sensing ambient temperature and sending a signal indicative thereof to said controller;
- a second pressure sensor for sensing the backpressure of said exhaust gas and sending a signal indicative thereof to said controller; and
- a level detector associated with said tank for detecting the quantity of water in said tank and sending a signal indicative thereof to said controller.

14. A method of controlling a fuel cell system comprising a fuel cell having an anode outlet that discharges a H$_2$-containing anode tailgas and a cathode outlet that discharges an O$_2$-containing cathode tailgas, a hydrogen source for providing hydrogen to an anode of said fuel cell, and an air compressor for providing oxygen to a cathode of said fuel cell, comprising the steps of:

providing a modulateable pressure regulator downstream of said cathode outlet for controlling backpressure on said cathode tailgas;

sensing ambient pressure surrounding said system, and sending a signal indicative thereof to a controller;

sensing the output pressure of said compressor, and sending a signal indicative of said output pressure to a controller; and controlling said backpressure, via said controller and regulator, in response to said signals to increase said backpressure when said ambient pressure decreases to substantially maintain said output pressure.

15. A method of controlling a fuel cell system comprising a fuel cell having an anode outlet that discharges a H$_2$-containing anode tailgas and a cathode outlet that discharges an O$_2$-containing cathode tailgas, a hydrogen source for providing hydrogen to an anode of said fuel cell, an air compressor for providing oxygen to a cathode of said fuel cell, and a water tank for collecting condensate condensed from at least said cathode tail gas, comprising the steps of:

providing a modulateable pressure regulator downstream of said cathode outlet for exerting varying backpressure on said cathode tailgas;

sensing ambient humidity surrounding said system, and sending a signal indicative thereof to a controller; and decreasing said backpressure, via said regulator and controller, in response to said signal as said ambient humidity increases.

16. A method of controlling a fuel cell system comprising a fuel cell having an anode outlet that discharges a H$_2$-containing anode tailgas and a cathode outlet that discharges an O$_2$-containing cathode tailgas, a hydrogen source for providing hydrogen to an anode of said fuel cell, an air compressor for providing oxygen to a cathode of said fuel cell, a condenser for condensing water from said cathode tailgas, and a water tank for collecting said water, comprising the steps of:

providing a modulateable pressure regulator downstream of said cathode outlet for effecting varying backpressure on said cathode tailgas;

sensing ambient pressure surrounding said system, and sending a signal indicative thereof to a controller;

sensing the amount of water in said water tank, and sending a signal indicative of said amount to a controller; and varying said backpressure, via said regulator and controller, in response to said signals to as to increase said backpressure when said ambient pressure decreases.

17. A method of controlling a fuel cell system comprising a fuel cell having an anode outlet that discharges a H$_2$-containing anode tailgas, a cathode outlet that discharges an O$_2$-containing cathode tailgas, a hydrogen source for providing hydrogen to an anode of said fuel cell, an air compressor for providing oxygen to a cathode of said fuel cell, a combustor burning said anode and cathode tailgases to produce a water-containing exhaust gas, a condenser downstream of said combustor for condensing water from said exhaust gas, and a water-tank collecting said water, comprising the steps of:

providing a modulateable pressure regulator downstream of said combustor for exerting varying backpressure on said exhaust gas;

sensing ambient pressure surrounding said system, and sending a signal indicative thereof to a controller;

sensing the amount of water in said tank, and sending a signal indicative of said amount to a controller; and varying said backpressure, via said regulator and controller, in response to said signals so as to increase said backpressure when said ambient pressure decreases.

18. A method of controlling a fuel cell system comprising a fuel cell having an anode outlet that discharges a H$_2$-containing anode tailgas and a cathode outlet that discharges an O$_2$-containing cathode tailgas, a hydrogen source for providing hydrogen to an anode of said fuel cell, and an air compressor operable at various output pressures in the range between 112 kPa to about 300 kPa for providing pressurized air to a cathode of said fuel cell, comprising the steps of:

(a) providing a modulateable pressure regulator downstream of said cathode outlet for controlling backpressure on said cathode tailgas;

(b) sensing at least one ambient condition selected from the group consisting of pressure, temperature and relative humidity, and sending a signal indicative thereof to a controller;

(c) sensing at least one operating condition of the system that is affected by said ambient condition, and sending a signal indicative thereof to a controller;

(d) constructing a lookup table that correlates target said backpressures needed to obtain optimal performance of said operating condition at various said ambient conditions;

(e) consulting said lookup table to determine said target backpressure for the ambient and system conditions sensed in steps (b) and (c); and (f) modulating said regulator to obtain said target backpressure.

* * * * *